United States Patent [19]

Inaba et al.

[11] Patent Number: 4,484,855
[45] Date of Patent: Nov. 27, 1984

[54] DOUBLE-HAND UNIT

[75] Inventors: Hajimu Inaba, Hino; Shinsuke Sakakibara, Kunitachi; Ryo Nihei, Musashino, all of Japan

[73] Assignee: Fujitsu Fanuc Limited, Tokyo, Japan

[21] Appl. No.: 387,881

[22] PCT Filed: Oct. 7, 1981

[86] PCT No.: PCT/JP81/00265
§ 371 Date: Jun. 4, 1982
§ 102(e) Date: Jun. 4, 1982

[87] PCT Pub. No.: WO82/01153
PCT Pub. Date: Apr. 15, 1982

[30] Foreign Application Priority Data
Oct. 8, 1980 [JP] Japan .............. 55-142630[U]

[51] Int. Cl.³ .............................. B25J 15/00
[52] U.S. Cl. .................... 414/736; 414/730; 414/741; 294/88; 294/87 R; 294/103 R
[58] Field of Search ............... 414/736, 729, 740, 730, 414/738, 741, 751, 744 A; 294/87 R, 88, 87.24, 103 R

[56] References Cited

U.S. PATENT DOCUMENTS

| 3,630,563 | 12/1971 | Jacksch | 294/88 |
| 4,302,144 | 11/1981 | Hallqvist | 414/590 |
| 4,343,590 | 8/1982 | D'Aloisio | 294/88 X |
| 4,345,866 | 8/1982 | Greene | 294/88 X |

FOREIGN PATENT DOCUMENTS 48-17864 2/1973 Japan .
48-51460 7/1973 Japan .

Primary Examiner—Robert J. Spar
Assistant Examiner—Terrance L. Siemens
Attorney, Agent, or Firm—Armstrong, Nikaido, Marmelstein & Kubovcik

[57] ABSTRACT

A double-hand unit adapted to be secured to the wrist part of an industrial robot and to be used for gripping shaft works or the like is disclosed. The double-hand unit comprises two hand units (2, 3) comprising at least two pairs of fingers (2-1, 2-2 and 3-1, 3-2), respectively, and being disposed in a back-to-back relationship with the respective opening sides of the fingers directed in opposite directions with each other. The driving mechanisms for operating the associated fingers of the hand units (2, 3) are disposed one over the other along a plane including the fingers.

3 Claims, 4 Drawing Figures

DOUBLE-HAND UNIT

DESCRIPTION

1. Field of the Invention

This invention relates to a hand unit for industrial robots which is capable of loading a work on a machine tool and unloading the same from the machine tool, and more particularly to a double-hand unit capable of gripping shaft works and the like.

2. Background Art

A double-hand unit is employed by a work loading and unloading robot associated with a machine tool in order to reduce the idle time of the machine tool, wherein one hand unit unloads a finished work while the other hand unit grips the next work to be machined, and then the double-hand unit is reversed to load the next work on the machine tool.

For this purpose, it is usual to constitute a double-hand unit by arranging two hand units along the axial direction of the grippers; however, in the case of an arrangement for handling shaft works, such an arrangement is impracticable due to the axially elongated shape of the shaft works, and also the hand unit is incapable of being reversed within the configuration of the machine tool.

Although there is only a limited space available in front of and under the chucking head of a machine tool, there is a substantially infinite space in the upward direction above the chucking head.

DISCLOSURE OF THE INVENTION

Accordingly, it is an object of the present invention to provide a double-hand unit capable of loading and unloading works quickly through the utilization of the space extending above the chucking head.

According to the present invention, there is provided a double-hand unit comprising two hand units, each including at least a pair of fingers, characterized in that the two hand units are disposed back to back, i.e. with the back of one hand adjacent the back of the other hand and their gripping openings facing in opposite directions, with the opening sides of the respective pairs of fingers directed in opposite directions and in that the driving units for operating the fingers of the respective hand units are disposed along the plane including the fingers.

BEST MODE OF CARRYING OUT THE INVENTION

Figure 1:
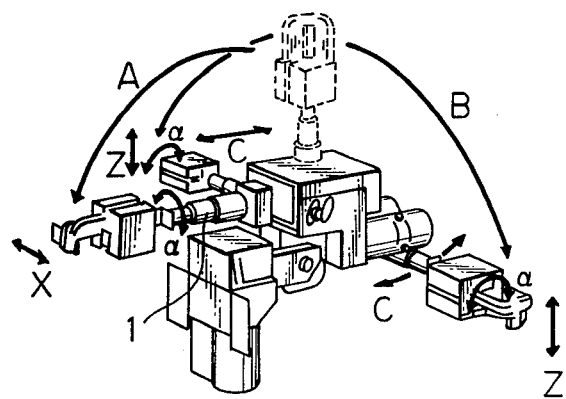
FIG. 1 is a perspective view of a preferred industrial robot to which the double-hand unit of the present invention can be applied favorably.

FIG. 1 is a perspective view of a preferred industrial robot to which the double-hand unit of the present invention can be applied favorably. In the industrial robot as shown in FIG. 1, an arm 1 is adapted to be controlled by a servomechanism so as to perform a horizontal linear motion along the X-axis, a swiveling motion in a vertical plane along the course A between the horizontal position and the vertical position, a twisting motion in a vertical plane from the vertical position along the course B, a vertical linear motion along the Z-axis and a swiveling motion in a horizontal plane along the course C. The turning motion of the wrist part about the α-axis can be controlled between 0°/90° and 0°/180° positions.

Figure 2:
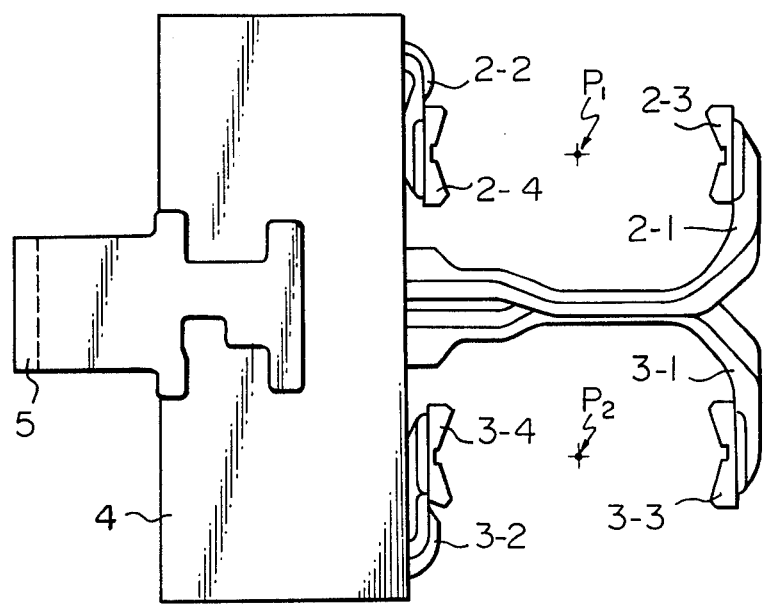
FIG. 2 is a side elevation of a double-hand unit for shaft works, embodied according to the present invention.
Figure 3:
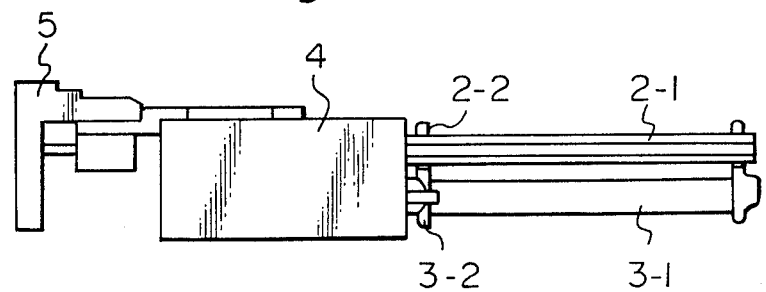
FIG. 3 is the top plan view of FIG. 2.

FIG. 2 is a side elevation of a double-hand unit for shaft works embodied according to the present invention and FIG. 3 is the top plan view thereof.

Referring to FIGS. 2 and 3, there are shown fingers 2-1 and 2-2 and gripping members 2-3 and 2-4 of a first hand unit 2 and fingers 3-1 and 3-2 and gripping members 3-3 and 3-4 of a second hand unit 3. The gripping center axes P1 and P2 of the first and second hand units, respectively, are parallel with each other and spaced by a predetermined distance. The first and second hand units 2 and 3 are disposed substantially in a back-to-back relationship with the respective backs of the fingers 2-1 and 3-1 disposed closely to each other so that the opening sides of the fingers 2-1 and 2-2 of the first hand unit 2 and the opening sides of the fingers 3-1 and 3-2 of the second hand unit 3 are directed upward and downward respectively. A reference numeral 4 designates a base section of the double-hand unit. In order to form the base section in the minimum possible dimension along the gripping center axes, the respective driving mechanisms for driving the fingers of the hand units are installed within the base section 4 in a vertical relationship (FIG. 2) as hereinafter described, namely, along a vertical plane including the fingers. The double-hand unit is secured to the wrist of a robot by means of a joint 5.

Figure 4:
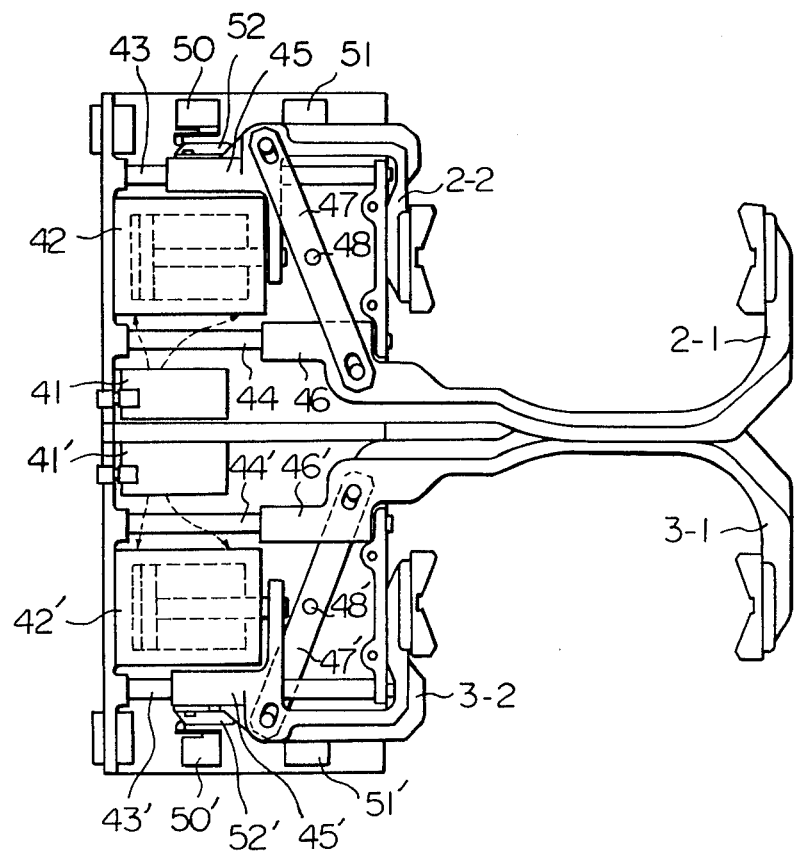
FIG. 4 is a side elevation of the respective driving mechanisms for operating the fingers of the hand units.

FIG. 4 illustrates the driving mechanisms for operating the fingers of the double-hand unit. The driving mechanism for the first hand unit and the driving mechanism for the second hand unit are entirely identical in construction, except that they are symmetrical with each other and are disposed in a vertical relationship along a vertical plane including the fingers or a plane within which the fingers operate. There are also shown electromagnetic valves 41 and 41', air cylinder mechanisms 42 and 42', parallel guide rods 43, 43', 44 and 44', the respective bosses 45, 45', 46 and 46' of the fingers, link plates 47 and 47', pivot shafts 48 and 48', limit switches 50, 50', 51 and 51', and dogs 52 and 52'.

The manner of operation of the first hand unit will be described hereinafter. In FIG. 4, the fingers 2-1 and 2-2 are in the fully open position and the limit switch 50 is actuated by the dog 52 so that this fully open position is detected. When the piston rod of the air cylinder mechanism 42 is pushed out through the operation of the electromagnetic valve 41, the boss 45 of the finger 2-2 connected to the piston rod moves rightward along the guide rod 43, while the link plate 47 turns about the pivot shaft 48 to cause the boss 46 of the finger 2-1 to move leftward along the guide rod 44, thus the fingers 2-1 and 2-2 are caused to move to the fully closed position. This fully closed position is detected by the limit switch 51. When the electromagnetic valve 41 is operated in the opposite direction, the reverse operations of those members and mechanisms are effected so that the fingers 2-1 and 2-2 return to the fully open position, as illustrated in FIG. 4. The manner of operation of the second hand unit is entirely identical with that of the first hand unit.

It is obvious that, according to the present invention, the respective opening sides of the fingers of the two hand units 2 and 3 are arranged so as to be directed in the opposite direction to each other and to be directed upward and downward respectively with their backs disposed back-to-back to each other; thus, the present invention provides a double-hand unit capable of quick loading and unloading of a work and utilizing the space above the chucking head of a machine tool. Furthermore, the dimension of the double-hand unit along the gripping center axes can be reduced owing to the vertical arrangement of the driving mechanisms for operating the respective fingers of the hand unit, in which the driving mechanisms are disposed one above the other.

We claim:

1. A double-hand unit for an industrial robot, adapted for handling shaft work, comprising:

a base section having therein a thin elongated mounting space, and having thereon a joint for attaching said unit to an arm of said industrial robot;

two hand units individually operatively mounted on said base section, each said hand unit comprising an outer finger extending outward from said base section and an inner finger disposed outside and adjacent to said base section, said outer and inner fingers of each hand unit defining therebetween a gripping cavity having an opening;

finger drive means comprising two finger drive mechanisms arranged side by side in said mounting space, each arranged to drive a respective associated hand unit, each said drive mechanism comprising a pair of parallel guide rods, one having slideably mounted thereon said inner finger of said associated hand unit and the other having slidably mounted thereon said outer finger of said associated hand unit, and air cylinder mechanism arranged between said pair of parallel guide rods and operatively connected to one of said fingers, and a centrally pivoted link plate having one end connected to said inner finger and the other end connected to said outer finger, said link plate being arranged to cause said inner and outer fingers to slide in opposite directions on said guide rods and thereby cause closing and opening of said fingers upon actuation of said air cylinder mechanism; and said two hand units being disposed in back-to-back relationship whereby said outer fingers are positioned adjacent to each other and said gripping cavity openings are directed in opposite directions from one another.

2. A double-hand unit as claimed in claim 1 wherein each finger drive mechanism comprises a pair of limit switches for detecting closing and opening of its associated hand unit, and a dog member attached to one of said fingers for actuating said limit switches.

3. A double-hand unit as claimed in claim 1, wherein said inner and outer fingers of each hand unit are provided with diametrically confronting gripping members for tightly gripping said shaft work.

* * * * *